(12) United States Patent
Plaum

(10) Patent No.: US 9,855,900 B2
(45) Date of Patent: Jan. 2, 2018

(54) MOTOR VEHICLE

(71) Applicant: Bayerische Motoren Werke Aktiengesellschaft, Munich (DE)

(72) Inventor: Michael Plaum, Roehrmoos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/241,357

(22) Filed: Aug. 19, 2016

(65) Prior Publication Data

US 2016/0355146 A1    Dec. 8, 2016

Related U.S. Application Data

(63) Continuation of application No. PCT/EP2015/053209, filed on Feb. 16, 2015.

(30) Foreign Application Priority Data

Feb. 21, 2014  (DE) .................. 10 2014 203 175

(51) Int. Cl.
*B60J 5/04* (2006.01)
*B60R 13/04* (2006.01)

(52) U.S. Cl.
CPC ............. *B60R 13/04* (2013.01); *B60J 5/0413* (2013.01); *B60J 5/0468* (2013.01); *B60R 2013/046* (2013.01)

(58) Field of Classification Search
CPC . B60J 5/04; B60J 5/0413; B60J 5/0412; B60J 5/0415; B60J 5/0468; B60J 5/0493; B60J 2013/046; B60R 13/04; B60R 13/043
See application file for complete search history.

(56) References Cited

U.S. PATENT DOCUMENTS

| 4,029,353 A | * | 6/1977 | Barenyi | ................. B60R 13/04 |
| | | | | 296/146.9 |
| 4,493,506 A | * | 1/1985 | Alexander | ............. B60R 13/04 |
| | | | | 293/128 |
| 5,229,175 A | * | 7/1993 | Seabolt | ................. B60R 13/04 |
| | | | | 24/289 |

(Continued)

FOREIGN PATENT DOCUMENTS

| CN | 102530093 A | 7/2012 |
| CN | 103273891 A | 9/2013 |

(Continued)

OTHER PUBLICATIONS

German-language Search Report issued in counterpart German Application No. 10 2014 203 175.3 dated Nov. 20, 2014 with partial English translation (13 pages).

(Continued)

*Primary Examiner* — Gregory Blankenship
(74) *Attorney, Agent, or Firm* — Crowell & Moring LLP

(57) ABSTRACT

A motor vehicle has at least one side door that is usable for different body variants. At least one passage opening is provided on an underside of a lower longitudinal section of a door body, which underside faces the vehicle interior, in which passage opening either a closure component is arranged or an additional trim component is fastened by way of a fastening device.

13 Claims, 2 Drawing Sheets

(56) References Cited

U.S. PATENT DOCUMENTS

| | | | |
|---|---|---|---|
| 6,810,624 B2 * | 11/2004 | Fujimura | B60J 10/80 296/146.9 |
| 2009/0045651 A1 * | 2/2009 | Binder | B60R 13/04 296/191 |
| 2009/0167010 A1 * | 7/2009 | Rompage | B60R 13/04 280/847 |
| 2010/0038931 A1 * | 2/2010 | Ihashi | E05F 5/003 296/209 |
| 2011/0012388 A1 * | 1/2011 | Iida | B60R 13/04 296/146.9 |
| 2011/0115253 A1 * | 5/2011 | Kishi | B62D 25/161 296/151 |
| 2012/0091762 A1 | 4/2012 | Pohl et al. | |
| 2012/0299329 A1 * | 11/2012 | Schidan | B60J 5/0408 296/146.7 |
| 2014/0049067 A1 * | 2/2014 | Kasuya | B60R 13/043 296/146.5 |
| 2015/0231954 A1 * | 8/2015 | Ryu | B60R 13/043 49/469 |
| 2016/0355146 A1 * | 12/2016 | Plaum | B60J 5/0468 |

FOREIGN PATENT DOCUMENTS

| | | |
|---|---|---|
| DE | 24 15 534 C2 | 1/1983 |
| DE | 35 13 054 A1 | 11/1986 |
| DE | 10 2005 009 183 A1 | 2/2006 |
| DE | 10 2008 025 330 A1 | 10/2008 |
| DE | 10 2005 017 744 B4 | 5/2011 |
| DE | 10 2010 045 982 A1 | 5/2011 |
| EP | 1 459 964 A1 | 9/2004 |
| GB | 2 435 851 B | 8/2009 |
| GB | 2484777 A | 4/2012 |

OTHER PUBLICATIONS

International Search Report (PCT/ISA/210) issued in PCT Application No. PCT/EP2015/053209 dated Apr. 23, 2015 with English translation (5 pages).

German-language Written Opinion (PCT/ISA/237) issued in PCT Application No. PCT/EP2015/053209 dated Apr. 23, 2015 (5 pages).

Chinese Office Action issued in counterpart Chinese Application No. 201580009382.7 dated May 4, 2017 with English-language translation (fifteen (15) pages).

\* cited by examiner

MOTOR VEHICLE

CROSS REFERENCE TO RELATED APPLICATIONS

This application is a continuation of PCT International Application No. PCT/EP2015/053209, filed Feb. 16, 2015, which claims priority under 35 U.S.C. §119 from German Patent Application No. 10 2014 203 175.3, filed Feb. 21, 2014, the entire disclosures of which are herein expressly incorporated by reference.

BACKGROUND AND SUMMARY OF THE INVENTION

The invention relates to a motor vehicle and, more particularly, to a door body for a motor vehicle door.

DE 35 13 054 A1 discloses a motor vehicle which has a body with laterally formed door cutout openings in which a respective side door is pivotably arranged. The respective side door has a door body which is provided with an outer door trim. At least on one door, the outer door trim is adjustable in its position with respect to the door body via two adjustment devices. The two adjustment devices are outwardly covered by a terminating strip.

Furthermore, motor vehicle doors are known which have fastening devices on a lower longitudinal edge on the outer side in order to fasten an additional trim component. In the top view of the outer side of the vehicle door, the additional trim component can have a different width in the vertical direction depending on the configuration of the door cutout opening.

For example, the additional trim component is shorter if a running board is provided on the body in the region of the sill. If the sill is not equipped with a running board, the additional trim component can be longer. In order to conceal the fastening devices for the additional trim component, a further additional trim component is required in the known motor vehicle doors.

It is the object of the invention to provide a motor vehicle with at least one side door which is usable in different body variants.

This and other objects are achieved by a motor vehicle according to the invention having a body which surrounds a vehicle interior. The body is provided with door cutout openings. A pivotable motor vehicle door is arranged in the respective door cutout opening. The respective motor vehicle door has a door body, wherein the door body is provided with a lower longitudinal portion.

In an advantageous manner, at least one passage opening is provided on a lower side of the lower longitudinal portion of the door body, which lower side points toward the vehicle interior. In the passage opening, in each case either a closure component is arranged or an additional trim component is fastened via a fastening device.

The lower longitudinal portion of the door body is advantageously provided with a step-shaped cross section which has an approximately horizontally running surface portion and an approximately vertical surface portion.

In an advantageous embodiment, a sill of the body has an upper approximately horizontally running surface portion, wherein the approximately horizontally running surface portion of the door body runs approximately parallel to the upper surface portion of the sill portion, wherein the sill has an approximately vertically running outer surface portion, and wherein the approximately vertically running surface portion of the door body covers an upper region of the sill portion.

In an advantageous manner, devices for fastening the additional trim component are provided in at least one surface portion of the door body.

In an advantageous embodiment, the devices for fastening the additional trim component are provided in the approximately vertical surface portion of the door body.

The devices which are formed in the surface portion of the door body and are intended for fastening the additional trim component are advantageously at least two passage openings and/or are advantageously at least two protruding devices which are arranged or formed on the surface portion of the door body.

In an advantageous manner, the additional trim component is fastened in the surface portion of the door body via fasteners, such as clips, screws or the like, which can be fastened or are lockable together with the additional trim component in the passage openings present in the door body.

In an advantageous embodiment, the additional trim component is fastened to the surface portion of the door body via passage openings which are formed on the additional trim component and in which the protruding devices are lockable. The protruding devices are formed on that surface portion of the door body which is opposite the passage openings.

The devices provided for fastening the additional trim component advantageously permit the additional trim component to be fastened to the door body by mounting the additional trim component in a single mounting direction.

In an advantageous manner, structural measures in the form of steps, projections and/or depressions or the like are provided on the approximately vertically running surface portion of the door body and are also provided in a correspondingly matching manner on an opposite, upper, outer, obliquely outwardly running surface portion of the additional trim component such that precise mounting positioning and an interlocking connection between the additional trim component and the door body are provided.

In an advantageous embodiment, the door body is composed of a metal and/or a nonmetal and the additional trim component is advantageously composed of a metal and/or a nonmetal.

In an advantageous manner, the nonmetal used for the door body and the nonmetal used for the additional trim component are a fiber-reinforced plastic.

The fibers for reinforcing the plastic are advantageously glass fibers, carbon fibers and/or aramid fibers.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
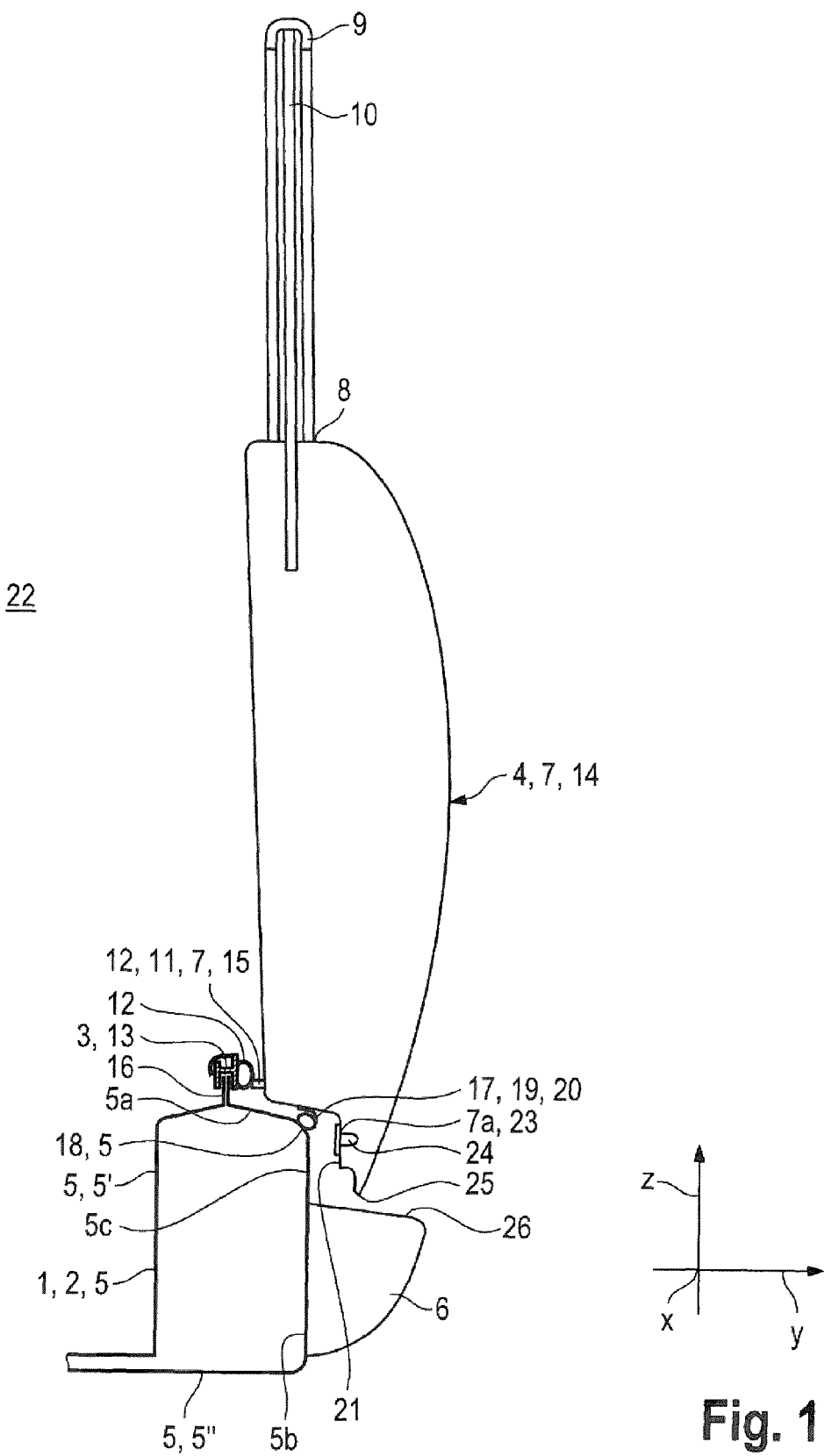
FIG. 1 is a section in the vertical direction through a motor vehicle door and an adjoining sill portion of a motor vehicle body, wherein the sill portion is provided with a running board.

FIG. 1 shows a sectional illustration of a motor vehicle door 4 which is arranged pivotably in a door cutout opening 3 of a body 2 of a motor vehicle 1. Only a sill portion 5 with a running board 6 of the body 2 of the motor vehicle 1 is illustrated in FIG. 1. The sill portion 5 is designed, for example, as a two-part profile component 5' and 5".

In the embodiment shown, the sill 5 of the body 2 has, on the profile component 5", an upper approximately horizontally running surface portion 5a pointing to the motor vehicle door 4. Furthermore, the profile component 5" of the sill 5 is provided with an approximately vertically running outer surface portion 5b adjoining the surface portion 5a.

In the embodiment shown, the motor vehicle door 4 has a door body 7. A window frame 9 is formed on an upper longitudinal edge 8 of the door body 7. A side window 10 is guided and/or held by the window frame 9. In another embodiment, the motor vehicle door 4 can be formed without a window frame 9.

A seal 12 which encircles around the motor vehicle door 4 is illustrated on a lower inner longitudinal edge 11 of the door body 7. Furthermore, a seal 13 is provided which is arranged in an encircling manner in the door cutout opening 3 on the body 2. In the embodiment shown, the encircling seal 12 lies against the encircling seal 13 in the closed state 14 of the vehicle door 4.

In FIG. 1, only the seal portions of the seals 12 and 13 in the region of the sill portion 5 are illustrated and have been omitted in the remaining regions of the door cutout opening 3 and of the motor vehicle door 4. In the embodiment shown in FIG. 1, the seals 12 and 13 are fastened to the door body 7 and to the sill portion 5 via webs 15 and 16.

FIG. 1 furthermore illustrates a further encircling seal arrangement 17 on an approximately horizontally running surface portion 20 of the door body 7 on a lower side 19 of the door body 7. In the closed state 14 of the vehicle door 4, the encircling seal arrangement 17 lies against the door cutout opening 3. It is shown in FIG. 1 that the encircling seal arrangement 17 lies against a longitudinal edge 18 of the sill portion 5, 5".

An approximately vertically running surface portion 21 of the door body 7 adjoins the approximately horizontally running surface portion 20 on the lower side 19 of the door body 7. The surface portion 21 points toward a vehicle interior 22.

The approximately horizontally running surface portion 20 of the door body 7 runs approximately parallel to the upper surface portion 5a of the sill 5. The approximately vertically running surface portion 21 of the door body 7 covers an upper region 5c of the sill 5. The upper region 5c of the sill 5 relates to the region around the longitudinal edge 18 of the sill 5, i.e. to the approximately horizontally running surface portion 5a of the profile component 5" of the sill 5 and to an upper portion of the approximately vertically running outer surface portion 5b.

In the embodiment shown, at least one passage opening 23 is formed on the surface portion 21 of the door body 7 on a lower side 19 of a lower longitudinal portion 7a of the door body 7, which lower side points toward the vehicle interior 22. In the embodiment shown, the lower longitudinal portion 7a of the door body 7 has a step-shaped cross section with an approximately horizontally running surface portion 20 and an approximately vertical surface portion 21.

The respective passage opening 23 is closed by a closure component 24, for example a stopper. A lower longitudinal edge 25 of the door body 7 points to an approximately horizontally running outer surface 26 of the running board 6.

Figure 2:
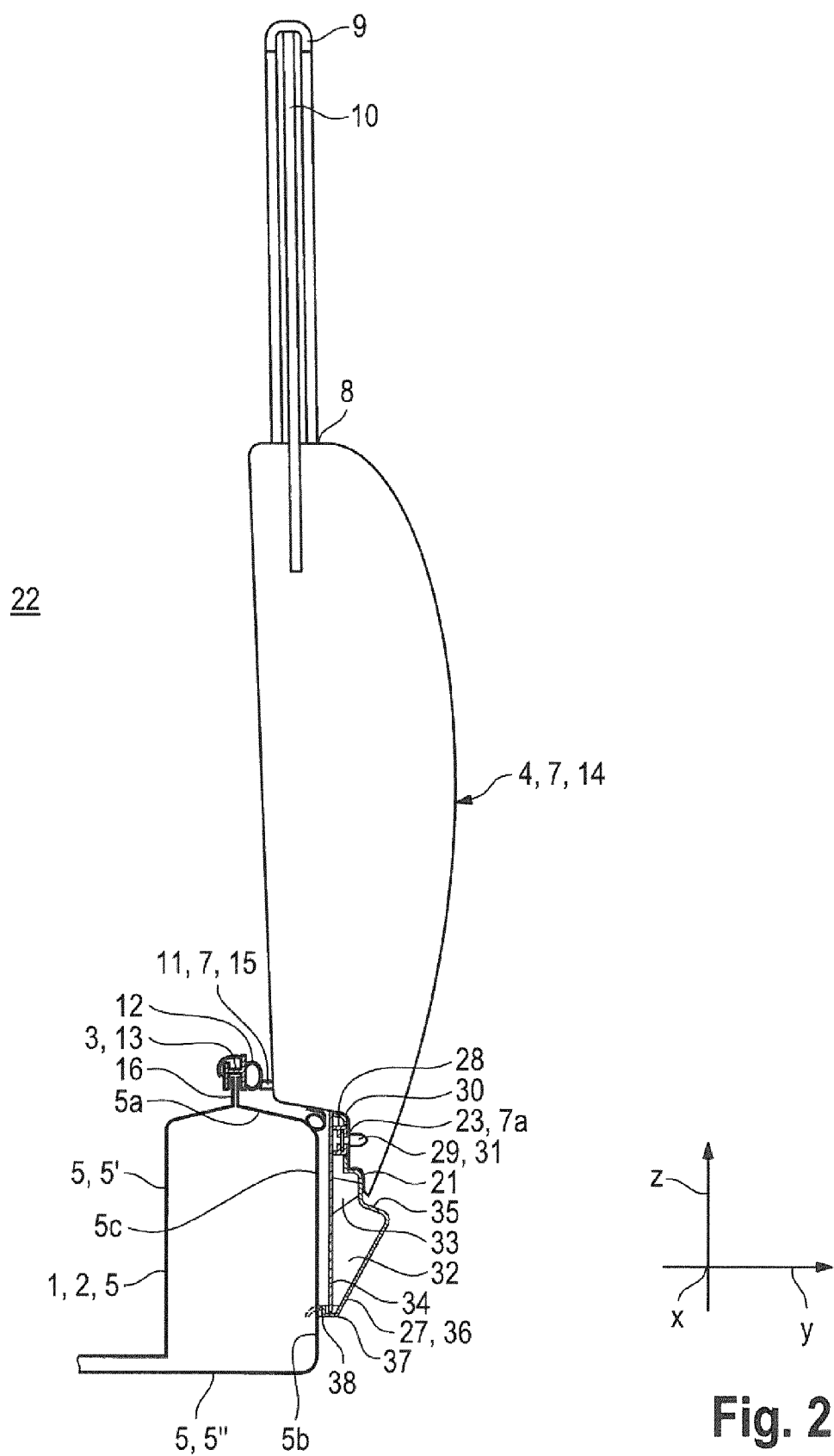
FIG. 2 is a section corresponding to FIG. 1, wherein the sill portion of the vehicle body does not have a running board and an additional trim component is arranged on the lower longitudinal edge of a door body of the motor vehicle door.

In contrast to FIG. 1, in the sectional view illustrated in FIG. 2 of a motor vehicle door 4 in a door cutout opening 3 of a body 2 of a motor vehicle 1, the sill portion 5 is not provided with a running board 6. In contrast to the embodiment of FIG. 1, to this end an additional trim component 27 is arranged on the lower approximately vertically running surface portion 21 of the door body 7 via a fastening device 28. The fastening device 28 can be a screw connection and/or a clip connection or another suitable fastener, such as, for example, an adhesive connection.

The embodiment shown in FIG. 2 depicts a clip 29 which is integrally formed or held on an upper longitudinal edge 30 of the additional trim component 27. A fastening portion 31 of the clip 29 is plugged through the passage opening 23 in the door body 7. The additional trim component 27 is held on the surface portion 21 of the door body 7 by the fastening device or the clip connection 28, 29, 31.

In the embodiment shown, the additional trim component 27 has an approximately triangular cross section. In order to reinforce the additional trim component 27, at least one reinforcing component 33 is provided in an interior 32 of the additional trim component 27. In the embodiment shown, the reinforcing component 33 is provided between an approximately vertically running surface portion 34 pointing toward the vehicle interior 22 and an upper, approximately obliquely outwardly running and outwardly pointing surface portion 35.

A lower outer surface portion 36 adjoins the upper outer surface portion 35 of the additional trim component 27. In the embodiment shown, the upper outer surface portion 35 of the additional trim component 27 is of step-shaped design corresponding to the cross-sectional shape of the surface portion 21 of the door body 7.

Structural measures in the form of steps, projections and/or depressions or the like are provided on the approximately vertically running surface portion 21 of the door body 7 and are also provided in a correspondingly matching manner on the opposite, upper, outer, obliquely outwardly running surface portion 35 of the additional trim component 27 such that precise mounting positioning and an interlocking connection between the additional trim component 27 and the door body 7 are provided.

The mutually coordinated shape of the surface portion 21 of the door body 7 and of the upper outer surface portion 35 of the additional trim component 27 results in an interlocking connection in the vertical direction z and outward in the transverse direction y of the vehicle. The fastening device 28 results in the additional trim component 27 being secured inward in the transverse direction y of the vehicle and in the longitudinal direction x of the vehicle.

In the embodiment shown in FIG. 2 of the additional trim component 27, a further seal 38 is arranged on a lower longitudinal edge 37 of the additional trim component 27.

As emerges from a comparison of FIGS. 1 and 2, in the two embodiments of the sill 5 with and without a running board 6, the same door body 7 or the same motor vehicle door 4 can be used without the passage openings 23 being visible from the outside.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle having a body that surrounds a vehicle interior in which body door cutout openings are provided, comprising:
   a pivotable motor vehicle door arranged in a respective door cutout opening, the motor vehicle door comprising a door body having a lower longitudinal portion, wherein
   at least one passage opening is provided on a lower side of the lower longitudinal portion of the door body, the lower side pointing toward the vehicle interior, and
   in the passage opening, in each case either a closure component is arranged or an additional trim component is fastened, the additional trim component being fastened to the door body from the vehicle interior toward the door body via a fastener.

2. The motor vehicle according to claim 1, wherein the lower longitudinal portion of the door body has a step-shaped cross-section on which an approximately horizontally running surface portion and an approximately vertically running surface portion are provided.

3. The motor vehicle according to claim 2, wherein:
   a sill of the body has an upper approximately horizontally running surface portion,
   the approximately horizontally running surface portion of the door body extends approximately parallel to the upper approximately horizontally running surface portion of the sill,
   the sill has an approximately vertically running outer surface portion, and
   the approximately vertically running surface portion of the door body covers an upper region of the approximately vertically running outer surface portion of the sill.

4. The motor vehicle according to claim 1, wherein the fastener that fastens the additional trim component is provided in at least one surface portion of the door body.

5. The motor vehicle according to claim 4, wherein the fastener is provided in an approximately vertical surface portion of the door body.

6. The motor vehicle according to claim 4, wherein
   the fastener includes at least two passage openings formed in an approximately vertical surface portion of the door body, and/or the fastener includes at least two protruding devices on the approximately vertical surface portion of the door body.

7. The motor vehicle according to claim 1, wherein
   the additional trim component is fastened in an approximately vertical surface portion of the door body via the fastener formed as a clip or screw and being fastenable with the additional trim component in a respective passage opening of the door body.

8. The motor vehicle according to claim 1, wherein:
   the additional trim component is fastened to an approximately vertical surface portion of the door body via passage openings formed on the additional trim component and in which protruding devices are fastenable or lockable, and
   the protruding devices are formed on the approximately vertical surface portion of the door body opposite the passage openings.

9. The motor vehicle according to claim 1, wherein the door body is formed of a non-metal and the additional trim component is formed of a non-metal.

10. The motor vehicle according to claim 9, wherein the non-metal of the door body and the additional trim component is a fiber-reinforced plastic.

11. The motor vehicle according to claim 10, wherein fibers of the fiber reinforced plastic are glass fibers, carbon fibers and/or aramid fibers.

12. A motor vehicle having a body that surrounds a vehicle interior in which body door cutout openings are provided, comprising:
   a pivotable motor vehicle door arranged in a respective door cutout opening, the motor vehicle door comprising a door body having a lower longitudinal portion, wherein
   at least one passage opening is provided on a lower side of the lower longitudinal portion of the door body, the lower side pointing toward the vehicle interior,
   in the passage opening, in each case either a closure component is arranged or an additional trim component is fastened, the additional trim component being fastened via a fastener,
   the fastener that fastens the additional trim component is provided in at least one surface portion of the door body, and
   the fastener provided for fastening the additional trim component permits the additional trim component to be fastened to the door body by a mounting movement in one direction.

13. A motor vehicle having a body that surrounds a vehicle interior in which body door cutout openings are provided, comprising:
   a pivotable motor vehicle door arranged in a respective door cutout opening, the motor vehicle door comprising a door body having a lower longitudinal portion, wherein:
   at least one passage opening is provided on a lower side of the lower longitudinal portion of the door body, the lower side pointing toward the vehicle interior,
   in the passage opening, in each case either a closure component is arranged or an additional trim component is fastened, the additional trim component being fastened via a fastener,
   the lower longitudinal portion of the door body has a step-shaped cross-section on which an approximately horizontally running surface portion and an approximately vertically running surface portion are provided,
   a sill of the body has an upper approximately horizontally running surface portion,
   the approximately horizontally running surface portion of the door body extends approximately parallel to the upper approximately horizontally running surface portion of the sill,
   the sill has an approximately vertically running outer surface portion,
   the approximately vertically running surface portion of the door body covers an upper region of the approximately vertically running outer surface portion of the sill,
   the approximately vertically running surface portion of the door body is configured structurally with one or more of a step, projection or depression, and
   an opposite, upper, outer, obliquely outwardly running surface portion of the additional trim component is correspondingly configured to match the configuration of the approximately vertically running surface portion of the door body, wherein precise position mounting and an interlocking connection are provided between the additional trim component and the door body.

* * * * *